US005831375A

United States Patent [19]

Benson, Jr.

[11] Patent Number: 5,831,375
[45] Date of Patent: Nov. 3, 1998

[54] ELECTROLUMINESCENT LAMP USING MULTILAYER OPTICAL FILM

[75] Inventor: Olester Benson, Jr., Woodbury, Minn.

[73] Assignee: Minnesota Mining and Manufacturing Company, St. Paul, Minn.

[21] Appl. No.: 900,078

[22] Filed: Jul. 24, 1997

Related U.S. Application Data

[63] Continuation of Ser. No. 729,542, Oct. 11, 1996, abandoned, which is a continuation of Ser. No. 514,172, Aug. 11, 1995, abandoned.

[51] Int. Cl.$^6$ .............................. H01J 5/16; H01J 61/40; H01J 1/62; H01J 63/04
[52] U.S. Cl. .......................... 313/110; 313/112; 313/509; 359/572
[58] Field of Search ..................................... 313/110, 111, 313/112, 113, 504, 505, 506, 509, 511, 512; 359/577, 580–81, 584–86, 587–88, 885, 887, 891

[56] References Cited

U.S. PATENT DOCUMENTS

| Re. 34,605 | 5/1994 | Schrenk et al. | 359/359 |
|---|---|---|---|
| 1,610,423 | 12/1926 | Cawley | 353/20 |
| 2,492,809 | 12/1949 | Marks | 88/65 |
| 2,887,566 | 5/1959 | Marks | 240/9.5 |
| 3,213,753 | 10/1965 | Rogers | 88/65 |
| 3,528,723 | 9/1970 | Rogers | 350/157 |
| 3,610,729 | 10/1971 | Rogers | 350/157 |
| 3,647,612 | 3/1972 | Schrenk et al. | 161/165 |
| 3,711,176 | 1/1973 | Alfrey, Jr. et al. | 350/1 |
| 3,759,647 | 9/1973 | Schrenk et al. | 425/131 |
| 3,773,882 | 11/1973 | Schrenk | 264/171 |
| 3,801,429 | 4/1974 | Schrenk et al. | 161/181 |
| 3,847,585 | 11/1974 | Chisholm | 65/99 |
| 3,935,351 | 1/1976 | Franz | 428/34 |
| 3,949,134 | 4/1976 | Wildorf | 428/215 |

(List continued on next page.)

FOREIGN PATENT DOCUMENTS

| 1327286 | 3/1994 | Canada | 88/113.18 |
|---|---|---|---|
| 062751 | 10/1981 | European Pat. Off. | G02B 1/08 |
| 056843 | 8/1982 | European Pat. Off. | G02F 1/33 |
| 597261 | 5/1984 | European Pat. Off. | G02F 1/1335 |
| 0314507 | 5/1989 | European Pat. Off. | H05B 33/20 |
| 469732 | 2/1992 | European Pat. Off. | G92B 1/04 |
| 514223 | 11/1992 | European Pat. Off. | G02B 5/08 |
| 552725 | 7/1993 | European Pat. Off. | G02B 27/28 |
| 573905 | 12/1993 | European Pat. Off. | G02B 27/28 |
| 606939 | 7/1994 | European Pat. Off. | G02F 1/1335 |
| 606940 | 7/1994 | European Pat. Off. | G02B 5/30 |
| 4121861 | 1/1992 | Germany | G02B 5/30 |

(List continued on next page.)

OTHER PUBLICATIONS

Lin, F., "Al,4: :Non–Imaging CCFT Coupler for LCD Backlighting", *SID 94 Digest,* vol. XXV, pp. 14–15 (1994).

Schrenk, W. et al., "Coextruded Elastomeric Optical Interference Film", SPE Annual Technical Conference, Atlanta, GA pp. 1703–1707 (1988).

Schrenk, W. et al., "Coextruded Infrared Reflecting Films", 7th Annual Meeting Polymer Processing Society, Hamilton, Ontario, Canada, pp. 222–223 (Apr. 1991).

Schrenk et al., "Coextruded Iridescent Film", TAPPI 1976 Paper Synthetics Conf., Atlanta, GA, pp. 141–145 (Sep. 27–29, 1976).

Im, J. et al., "Coextruded Microlayer Film and Sheet", *Journal of Plastic Film and Sheeting,* vol. 4, pp. 104–115 (Apr. 1988).

(List continued on next page.)

*Primary Examiner*—Sandra L. O'Shea
*Assistant Examiner*—Mack Haynes
*Attorney, Agent, or Firm*—John A. Fortkort

[57] ABSTRACT

Electroluminescent lamps incorporating one or more multilayer optical films according to the present invention to polarize and/or reflect light. The multilayer optical films exhibit the ability to reflect significant amounts of normal and off-axis incident light.

22 Claims, 11 Drawing Sheets

U.S. PATENT DOCUMENTS

| | | | |
|---|---|---|---|
| 3,990,784 | 11/1976 | Gelber | 350/166 |
| 4,025,688 | 5/1977 | Nagy et al. | 428/350 |
| 4,069,630 | 1/1978 | Chess et al. | 52/172 |
| 4,076,889 | 2/1978 | Sasaki et al. | 428/333 |
| 4,094,947 | 6/1978 | Alfrey, Jr. et al. | 264/171 |
| 4,095,013 | 6/1978 | Burger | 428/522 |
| 4,158,718 | 6/1979 | Kehl et al. | 428/461 |
| 4,268,127 | 5/1981 | Oshima et al. | 350/337 |
| 4,308,316 | 12/1981 | Gordon | 428/336 |
| 4,310,584 | 1/1982 | Cooper et al. | 428/212 |
| 4,315,258 | 2/1982 | McKnight et al. | 340/784 |
| 4,427,741 | 1/1984 | Aizawa et al. | 428/332 |
| 4,446,305 | 5/1984 | Rogers et al. | 528/348 |
| 4,500,173 | 2/1985 | Leibowitz et al. | 350/345 |
| 4,513,023 | 4/1985 | Wary | 427/54.1 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,534,743 | 8/1985 | D'Onofrio et al. | 445/24 |
| 4,540,623 | 9/1985 | Im et al. | 428/220 |
| 4,678,285 | 7/1987 | Ohta et al. | 350/345 |
| 4,798,448 | 1/1989 | van Raalte | 350/345 |
| 4,917,465 | 4/1990 | Conner et al. | 350/335 |
| 4,932,754 | 6/1990 | Haisma et al. | 359/586 X |
| 4,937,134 | 6/1990 | Schrenk et al. | 428/213 |
| 4,966,438 | 10/1990 | Mouchart et al. | 359/586 X |
| 4,971,843 | 11/1990 | Michelotti et al. | 428/34 |
| 5,089,318 | 2/1992 | Shetty et al. | 428/212 |
| 5,094,788 | 3/1992 | Schrenk et al. | 264/171 |
| 5,094,793 | 3/1992 | Schrenk et al. | 264/171 |
| 5,095,210 | 3/1992 | Wheatley et al. | 250/339 |
| 5,103,337 | 4/1992 | Schrenk et al. | 359/359 |
| 5,122,905 | 6/1992 | Wheatley et al. | 359/586 |
| 5,122,906 | 6/1992 | Wheatley | 359/586 |
| 5,126,880 | 6/1992 | Wheatley et al. | 359/587 |
| 5,149,578 | 9/1992 | Wheatley et al. | 428/213 |
| 5,157,526 | 10/1992 | Kondo et al. | 359/63 |
| 5,159,478 | 10/1992 | Akiyama et al. | 359/69 |
| 5,202,074 | 4/1993 | Schrenk et al. | 264/241 |
| 5,217,794 | 6/1993 | Schrenk | 428/220 |
| 5,233,465 | 8/1993 | Wheatley et al. | 359/359 |
| 5,234,729 | 8/1993 | Wheatley et al. | 428/30 |
| 5,255,029 | 10/1993 | Vogeley et al. | 353/122 |
| 5,262,894 | 11/1993 | Wheatley et al. | 359/586 X |
| 5,269,995 | 12/1993 | Ramanathan et al. | 264/171 |
| 5,278,694 | 1/1994 | Wheatley et al. | 359/359 |
| 5,316,703 | 5/1994 | Schrenk | 264/1.3 |
| 5,325,218 | 6/1994 | Willett et al. | 359/53 |
| 5,333,072 | 7/1994 | Willett | 359/41 |
| 5,339,198 | 8/1994 | Wheatley et al. | 359/359 |
| 5,360,659 | 11/1994 | Arends et al. | 428/216 |
| 5,389,324 | 2/1995 | Lewis et al. | 264/171 |
| 5,400,179 | 3/1995 | Ito | 359/588 |
| 5,422,756 | 6/1995 | Weber | 359/487 |
| 5,424,119 | 6/1995 | Phillips et al. | 428/328 |
| 5,448,404 | 9/1995 | Schrenk et al. | 359/586 X |
| 5,451,449 | 9/1995 | Shetty et al. | 428/195 |
| 5,486,949 | 1/1996 | Schrenk et al. | 359/498 |
| 5,540,978 | 7/1996 | Schrenk | 428/212 |
| 5,552,927 | 9/1996 | Wheatley et al. | 359/359 |
| 5,568,316 | 10/1996 | Schrenk et al. | 359/584 |

FOREIGN PATENT DOCUMENTS

| | | | |
|---|---|---|---|
| 63-181201 | 7/1988 | Japan | F21V 5/02 |
| 4-141603 | 5/1992 | Japan | G02B 5/30 |
| 4-184429 | 7/1992 | Japan | G03B 21/14 |
| 5-288910 | 11/1993 | Japan | G02B 5/18 |
| 6-11607 | 1/1994 | Japan | G02B 5/18 |
| 218041 | 12/1993 | Switzerland | G02F 1/1335 |
| 2052779 | 1/1981 | United Kingdom | G02F 1/133 |
| WO 91/09719 | 7/1991 | WIPO | B32B 5/30 |
| WO 94/11776 | 5/1994 | WIPO | G02F 1/1335 |
| WO 94/29765 | 12/1994 | WIPO | B29C 59/04 |
| WO 95/17303 | 6/1995 | WIPO | B32B 7/02 |
| WO 95/17691 | 6/1995 | WIPO | G02B 5/30 |
| WO 95/17692 | 6/1995 | WIPO | G02B 5/30 |
| WO 95/17699 | 6/1995 | WIPO | G02F 1/1335 |

OTHER PUBLICATIONS

Schrenk et al., "Coextruded Multilayer Polymer Films and Sheet", *Polymer Blends*, vol. 2, Ch. 15, pp. 129–165, Academic Press, Inc. (1978).

Hodgkinson, I. et al., "Effective Principal Refractive Indices and Column Angles for Periodic Stacks of Thin Birefringent Films", *J. Opt. Soc. Am. A*, vol. 10, No. 9, pp. 2065–2071 (1993).

Wu et al., "High Transparent Sheet Polarizer Made with Birefringent Materials", *Jpn. J. of App. Phys.*, vol. 34, pp. L 997–999 (Aug. 1995).

Schrenk et al., "Interfacial Flow Instability in Multilayer Coextrusion", *Polymer Engineering and Science*, vol. 18(8), pp. 620–623 (Jun. 1978).

Schrenk, W., "New Developments in Coextrusion", International Conference on Advances in Polymer Processing, New Orleans, Louisiana, (Apr., 1991).

Alfrey, Jr. et al., "Physical Optics of Iridescent Multilayer Plastic Films", *Polymer Engineering and Science*, vol. 9, No. 6, pp. 400–404 (Nov. 1969).

Radford et al., "Reflectivity of Iridescent Coextruded Multilayered Plastics Films", Reflectivity of Iridescent Coextruded Multilayered Plastic Films, *Polymer Engineering and Science*, vol. 13, No. 3, (May 1973); Dow Chemical Co., American Chemical Society Symposium on Coextruded Plastic Films, Fibers, Composites, Apr. 9–14, 1972.

Weber, M., "23:3: Retroreflecting Sheet Polarizer", *SID 92 Digest*, pp. 427–429 (1992).

Weber, M., "P–61: Retroreflecting Sheet Polarizer", *SID 93 Digest*, pp. 669–672 (1993).

ELECTROLUMINESCENT LAMP USING MULTILAYER OPTICAL FILM

This is a continuation of application Ser. No. 08/729,542 filed Oct. 11, 1996, now abandoned which is a continuation of application Ser. No. 08/514,172 filed Aug. 11, 1995 now abandoned.

FIELD OF THE INVENTION

The present invention relates to the field of electroluminescent lamps. More particularly, the present invention relates to electroluminescent lamps employing one or more layers of multi-layer optical film according to the present invention as a back reflector and/or reflective polarizer.

BACKGROUND OF THE INVENTION

Electroluminescent lamps are known and are typically used for applications in which flat or planar light sources are useful. The lamps rely on the electroluminence of a phosphor material that, in the presence of an alternating electric field, becomes excited and emits photons with most of the radiated energy falling within the visible light spectrum. The electroluminescent material may comprise a metal activated zinc sulfide or any other material which exhibits electroluminescent behavior in the presence of electric fields.

One problem with such lamps is their relatively low efficiency when compared to other types of light sources such as incandescent, fluorescent, etc. This problem is worsened in electroluminescent lamps which typically also rely on conventional back reflectors, including pigmented surfaces, silvered mirrors, polished metallic or metallized surfaces, etc.

The conventional reflectors suffer from relatively high absorbance of light incident on their surfaces, typically absorbing about 4–7% of the light incident on them. As a result, the amount of light remaining after each reflection is less than that initially provided. In devices in which multiple reflections are encountered, the overall output of the optical device can be substantially limited. In addition, many of the conventional reflectors are too bulky and/or heavy for many of the applications, particularly in laptop computer displays and other portable devices.

Furthermore, the efficiency problems with electroluminescent lamps are also made worse when polarized light is desired. Polarized light is desirable in many applications, including backlit LCD displays used with portable computers and other devices.

Polarizers can be generally categorized as either absorptive or reflective. Typical absorptive polarizers are oriented dyed polymer films, while typical reflective polarizers are tilted thin film polarizers, also known as MacNeille polarizers. Absorptive polarizers do, of course, contribute to the absorptive losses of optical devices in which they are used, thereby limiting the output of those devices.

The absorptive losses of known reflectors and polarizers also become more of a concern if the electroluminescent lamps are used with a brightness enhancement film such as micro-replicated brightness enhancement film or any other type of reflective polarizer which causes light to typically travel through several reflections, thereby amplifying absorptive losses with every reflection.

To overcome some of the problems of weight, bulk and absorption of conventional reflectors, multi-layered polymer films have been used to reflect and/or polarize light. Such polymeric films are, however, subject to a number of other disadvantages including iridescence, as well as poor reflectivity when off-axis light approaches the surface of the film. The off-axis light is typically transmitted through the films, rather than being reflected, thereby resulting in transmissive losses rather than absorptive losses. Whether light is lost through absorption or transmission, however, the output of the optical device is limited.

Other problems with known multi-layer polymer films used to provide reflectors and/or polarizers are that the materials and methods used to manufacture the films present serious problems due to poor optical transmission, extrudibility, and high costs.

SUMMARY OF THE INVENTION

Electroluminescent lamps according to the present invention incorporate one or more layers of the multilayer optical film according to the present invention to reflect and/or reflectively polarize light emitted by the lamp.

As such, electroluminescent lamps incorporating multilayer optical film according to the present invention enjoy many advantages due to the low absorptivity of the film and its ability to reflect light approaching at shallow angles, as well as normal to the film.

In those situations where the multilayer optical film is used as a reflective polarizer, the electroluminescent lamps can be constructed with a multilayer optical film which transmits a significant amount of light having one plane of polarization while reflecting a significant amount of light having an orthogonally oriented polarization. A further advantage is that the relative percentages of transmitted/reflected light can be largely controlled by the multilayer optical film used in the present invention.

If the multilayer optical film according to the present invention is used a back reflector in an electroluminescent lamp (alone, or in combination with a reflective polarizing layer of multilayer optical film), the electroluminescent lamp can take advantage of the high reflectivity of the multilayer optical film according to the present invention that can reflect over 99% of the light striking the surface of the film, including a significant portion of off-normal light.

As a result of the unique properties of the multilayer optical film, the efficiency of electroluminescent lamps can be enhanced, whether polarized light or non-polarized light is desired.

Yet another advantage of electroluminescent lamps employing multilayer optical films as reflective polarizers and/or back reflectors according to the present invention is their relatively low weight as compared to many conventional reflectors and/or polarizers.

Still another advantage of electroluminescent lamps employing multilayer optical films according to the present invention is that because the film is relatively thin as compared to many conventional reflectors and/or polarizers, the electroluminescent lamps can be manufactured to occupy limited space in a system employing the lamp.

Additional features and advantages of electroluminescent lamps according to the present invention will be apparent upon reading the detailed description of illustrative embodiments below.

DETAILED DESCRIPTION OF ILLUSTRATIVE EMBODIMENTS OF THE INVENTION

Electroluminescent lamps according to the present invention rely on the unique and advantageous properties of multilayer optical films according to the present invention. The advantages, characteristics and manufacturing of such films are most completely described in copending and commonly assigned U.S. patent application Ser. No. 08/402,041, filed Mar. 10, 1995, titled OPTICAL FILM, which is hereby incorporated by reference.

That application describes multilayer optical films useful in electroluminescent lamps according to the present invention in detail. A relatively brief description of the properties and characteristics of the multilayer optical film is presented below followed by a description of illustrative embodiments of electroluminescent lamps using the multilayer optical film according to the present invention.

I. Multilayer Optical Film

Multilayer optical films as used in conjunction with the present invention exhibit relatively low absorption of incident light, as well as high reflectivity for off-axis as well as normal light rays. These properties generally hold whether the films are used for pure reflection or reflective polarization of light. The unique properties and advantages of the multi-layer optical film provides an opportunity to design highly efficient electroluminescent lamps which emit substantially polarized light and exhibit low absorption losses when compared to known electroluminescent lamps.

Figure 1A:
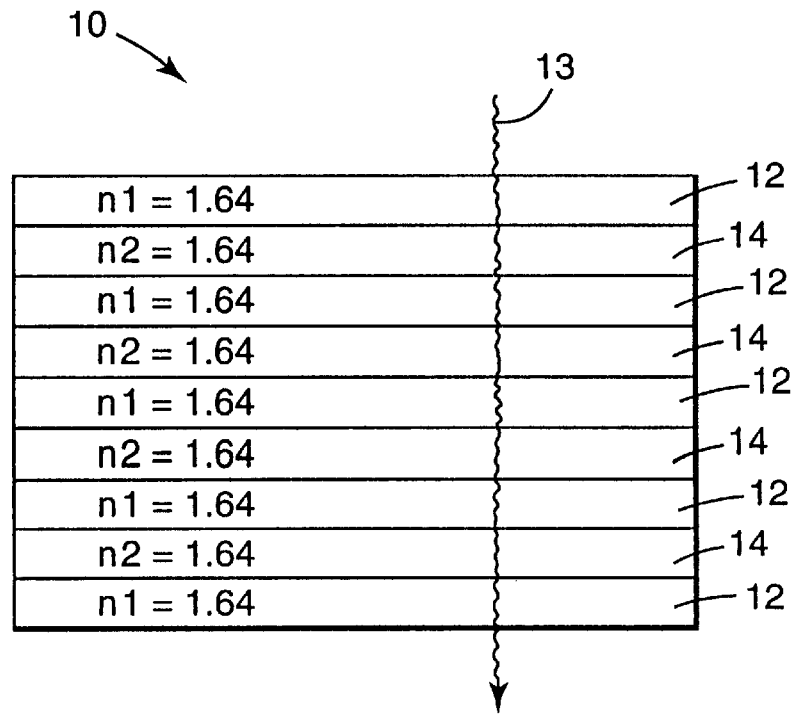
FIGS. 1a and 1b are diagrammatical views of the multilayer optical film of the present invention.
Figure 1B:
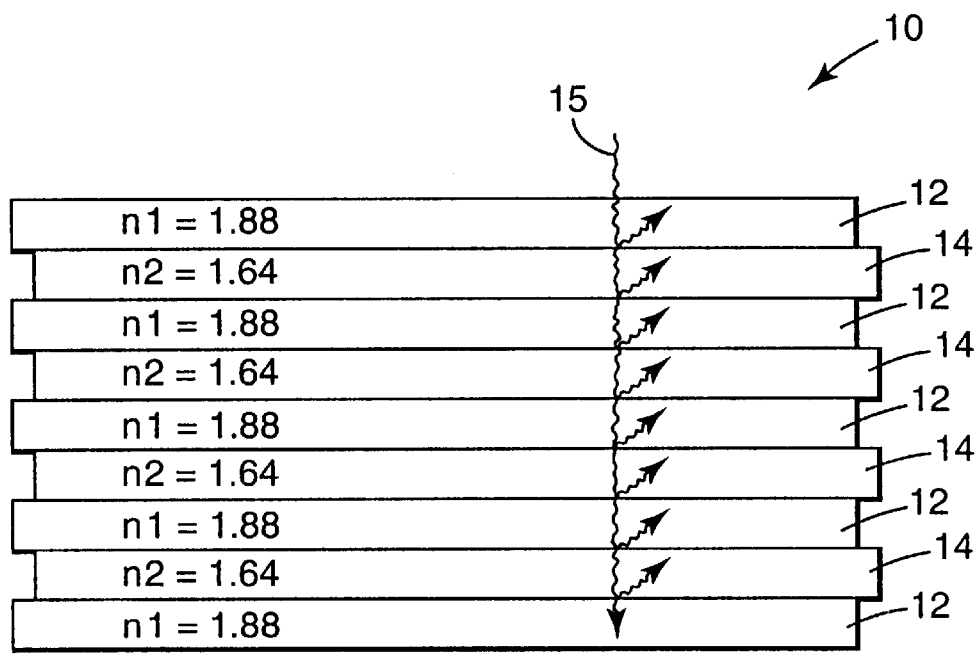

The multilayer optical film of the present invention as illustrated in FIGS. 1a and 1b includes a multilayer stack 10 having alternating layers of at least two materials 12 and 14. At least one of the materials has the property of stress induced birefringence, such that the index of refraction (n) of the material is affected by the stretching process. FIG. 1a shows an exemplary multilayer stack before the stretching process in which both materials have the same index of refraction. Light ray 13 experiences no index of refraction and passes through the stack. In FIG. 1b, the same stack has been stretched, thus increasing the index of refraction of material 12. The difference in refractive index at each boundary between layers will cause part of ray 15 to be reflected. By stretching the multilayer stack over a range of uniaxial to biaxial orientation, a film is created with a range of reflectivities for differently oriented plane-polarized incident light. The multilayer stack can thus be made useful as reflective polarizers or mirrors.

Multilayer optical films constructed according to the present invention exhibit a Brewster angle (the angle at which reflectance goes to zero) which is very large or is nonexistent. In contrast, known multilayer polymer films exhibit relatively small Brewster angles, resulting in transmission of light and/or undesirable iridescence. The multilayer optical films according to the present invention, however, allow for the construction of mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

Figure 2:
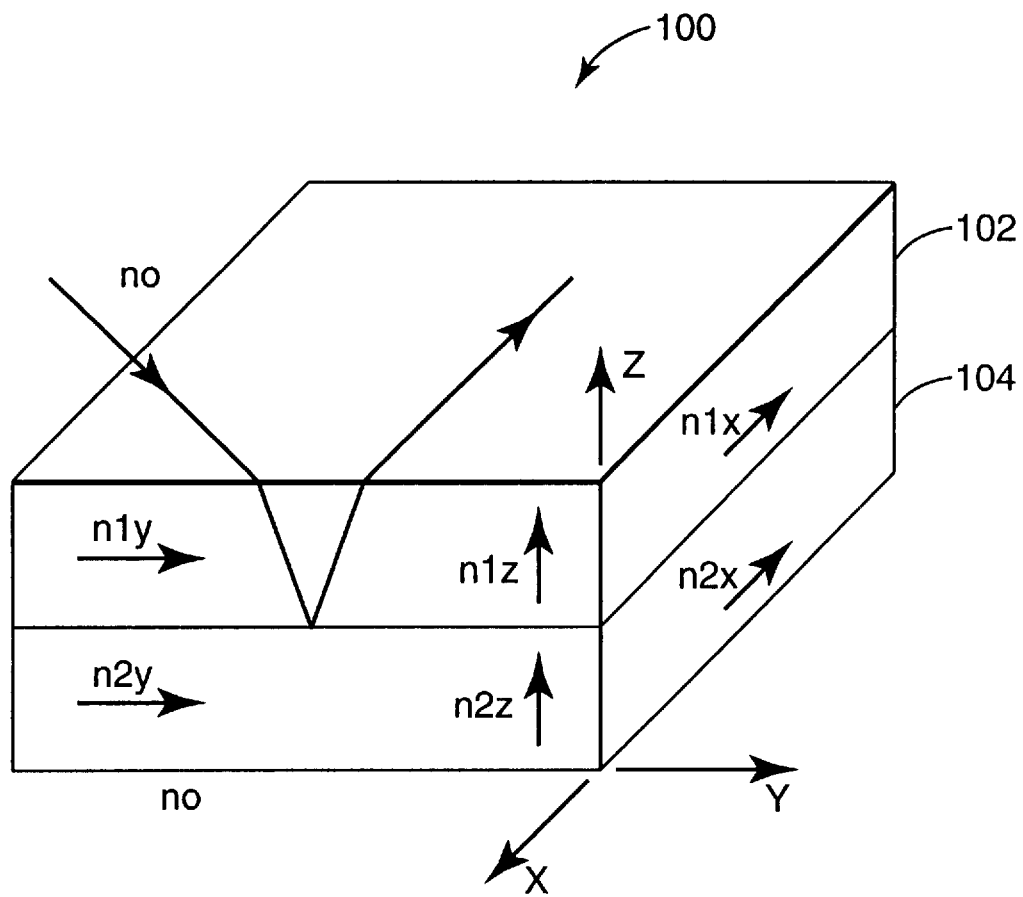
FIG. 2 depicts a two layer stack of films forming a single interface.

FIG. 2 shows two layers of a multilayer stack, and indicates the three dimensional indices of refraction for each layer. The indices of refraction for each layer are n1x, n1y, and n1z for layer 102, and n2x, n2y, and n2z for layer 104. The relationships between the indices of refraction in each film layer to each other and to those of the other layers in the film stack determine the reflectance behavior of the multilayer stack at any angle of incidence, from any azimuthal direction. The principles and design considerations described in U.S. patent application Ser. No. 08/402,041 can be applied to create multilayer stacks having the desired optical effects for a wide variety of circumstances and applications. The indices of refraction of the layers in the multilayer stack can be manipulated and tailored to produce the desired optical properties.

Referring again to FIG. 1, the multilayer stack 10 can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

The preferred multilayer stack is comprised of low/high index pairs of film layers, wherein each low/high index pair of layers has a combined optical thickness of ½ the center wavelength of the band it is designed to reflect. Stacks of such films are commonly referred to as quarterwave stacks.

If reflective films are desired, the desired average transmission for light of each polarization and plane of incidence generally depends upon the intended use of the reflective film. The average transmission along each stretch direction at normal incidence for a narrow bandwidth reflective film across a 100 nm bandwidth within the visible spectrum is desirably less than 30%, preferably less than 20% and more preferably less than 10%. A desirable average transmission along each stretch direction at normal incidence for a partial reflective film ranges anywhere from, for example, 10% to 50%, and can cover a bandwidth of anywhere between, for example, 100 nm and 450 nm, depending upon the particular application.

For a high efficiency reflective film, average transmission along each stretch direction at normal incidence over the visible spectrum (400–700 nm) is desirably less than 10%, preferably less than 5%, more preferably less than 2%, and even more preferably less than 1%. The average transmission at 60 degrees from the normal for a high efficiency reflective film from 400–700 nm is desirably less than 50%, preferably less than 30%, more preferably less than 20%, and even more preferably less than 90%.

In addition, asymmetric reflective films may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g, 400–850 nm).

Multilayer optical films can also be designed to operate as reflective polarizers which have high reflectivity for light with its plane of polarization parallel to one axis, for a broad range of angles of incidence, and simultaneously have low reflectivity and high transmission for light with its plane of polarization parallel to the other axis for a broad range of angles of incidence. By controlling the three indices of refraction of each film, nx, ny and nz, the desired polarizer behavior can be obtained.

For many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest. Average transmission at normal incidence for a narrowband polarizer across a 100 nm bandwidth is desirably at least 50%, preferably at least 70% and more preferably at least 90%. The average transmission at 60 degrees from the normal for p-polarized light (measured along the transmission axis) for a narrow band polarizer across a 100 nm bandwidth is desirably at least 50%, preferably at least 70% and more preferably at least 80%.

The average transmission at normal incidence for a polarizer in the transmission axis across the visible spectrum (400–700 nm for a bandwidth of 300nm) is desirably at least 50%, preferably at least 70%, more preferably at least 85%, and even more preferably at least 90%. The average transmission at 60 degrees from the normal (measured along the transmission axis) for a polarizer from 400–700 nm is desirably at least 50%, preferably at least 70%, more preferably at least 80%, and even more preferably at least 90%.

For certain applications, high reflectivity in the transmission axis at off-normal angles are preferred. The average reflectivity for light polarized along the transmission axis should be more than 20% at an angle of at least 20 degrees from the normal.

In addition, although reflective polarizing films and asymmetric reflective films are discussed separately herein, it should be understood that two or more of such films could be provided to reflect substantially all light incident on them (provided they are properly oriented with respect to each other to do so) If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The % RMS color, CRMS, can be determined according to the equation:

$$C_{RMS} = \frac{\int_{\lambda 1}^{\lambda 2} ((T - \overline{T})^2)^{1/2} d\lambda}{\overline{T}}$$

where the range $\lambda 1$ to $\lambda 2$ is the wavelength range, or bandwidth, of interest, T is the transmissivity along the transmission axis, and $\overline{T}$ is the average transmissivity along the transmission axis in the wavelength range of interest.

For applications where a low color polarizer is desirable, the % RMS color should be less than 10%, preferably less than 8%, more preferably less than 3.5%, and even more preferably less than 2.1% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For example, for narrow band polarizers having a bandwidth of approximately 100 nm, average transmission along the extinction axis at normal incidence is desirably less than 50%, preferably less than 30%, more preferably less than 10%, and even more preferably less than 3%. For polarizers having a bandwidth in the visible range (400–700 nm, or a bandwidth of 300 nm), average transmission along the extinction axis at normal incidence is desirably less than 40%, more desirably less than 25%, preferably less than 15%, more preferably less than 5% and even more preferably less than 3%.

Materials Selection and Processing

With the design considerations described in the above mentioned U.S. patent application Ser. No. 08/402,041, one of ordinary skill will readily appreciate that a wide variety of materials can be used to form multilayer reflective films or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite to or the same as that of the first material. Or, the second material may have no birefringence.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexanedimethanol); (f) alkane dicarboxylic acids; and/ or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexanedimethanol); (f) alkane dicarboxylic acids; and/ or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Particularly preferred combinations of layers in the case of reflective films include PET/Ecdel, PEN/Ecdel, PEN/sPS, PEN/THV, PEN/co-PET, and PET/sPS, where "co-PET" refers to a copolymer or blend based upon terephthalic acid (as described above), Ecdel is a thermoplastic polyester commercially available from Eastman Chemical Co., and THV is a fluoropolymer commercially available from Minnesota Mining and Manufacturing Company, St. Paul, Minn.

The number of layers in the film is selected to achieve the desired optical properties using the minimum number of layers for reasons of film thickness, flexibility and economy. In the case of both polarizers and reflective films, the number of layers is preferably less than 10,000, more preferably less than 5,000, and even more preferably less than 2,000.

As discussed above, the ability to achieve the desired relationships among the various indices of refraction (and thus the optical properties of the multilayer film) is influenced by the processing conditions used to prepare the multilayer film. In the case of organic polymers which can be oriented by stretching, the films are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of reflective films the film is stretched substantially in two directions (biaxial orientation).

The film may be allowed to dimensionally relax in the cross-stretch direction from the natural reduction in cross-stretch (equal to the square root of the stretch ratio); it may simply be constrained to limit any substantial change in cross-stretch dimension; or it may be actively stretched in the cross-stretch dimension. The film may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, a stretch ratios in the range from 1:2 to 1:10 (more preferably 1:3 to 1:7) in the stretch direction and from 1:0.5 to 1:10 (more preferably from 1:0.5 to 1:7) orthogonal to the stretch direction is preferred.

Suitable multilayer films may also be prepared using techniques such as spin coating (e.g., as described in Boese et al., J. Polym. Sci.: Part B, 30:1321 (1992) for birefringent polyimides, and vacuum deposition (e.g., as described by Zang et. al., Appl. Phys. Letters, 59:823 (1991) for crystalline organic compounds; the latter technique is particularly useful for certain combinations of crystalline organic compounds and inorganic materials.

Exemplary multilayer reflective films and polarizers will now be described in the following examples.

EXAMPLE 1 (PEN:THV 500, 449, Mirror)

A coextruded film containing 449 layers was made by extruding the cast web in one operation and later orienting the film in a laboratory film-stretching apparatus. A Polyethylene naphthalate (PEN) with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching film that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 3:
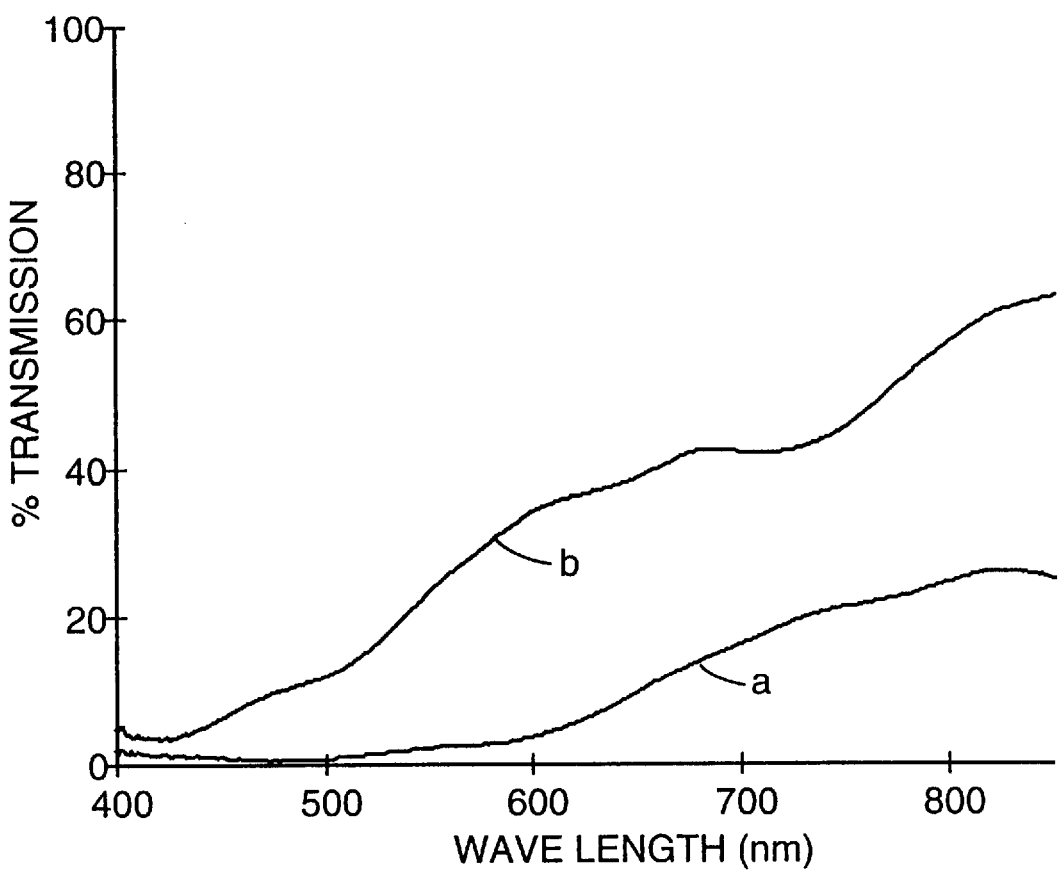
FIGS. 3–7 depict the optical performance of multilayer optical films described in Examples 1–6.

FIG. 3 shows the transmission of this multilayer film. Curve (a) shows the response at normal incidence, while curve (b) shows the response at 60 degrees.

EXAMPLE 2 (PEN:PMMA, 601, Mirror)

A coextruded film containing 601 layers was made on a sequential flat-film-making line via a coextrusion process. Polyethylene Naphthalate (PEN) with an Intrinsic Viscosity of 0.57 dl/g (60 wt. % phenol/40 wt. % dichlorobenzene) was delivered by extruder A at a rate of 114 pounds per hour with 64 pounds per hour going to the feedblock and the rest going to skin layers described below. PMMA (CP-82 from ICI of Americas) was delivered by extruder B at a rate of 61 pounds per with all of it going to the feedblock. PEN was on the skin layers of the feedblock. The feedblock method was used to generate 151 layers using the feedblock such as those described in U.S. Pat. No. 3,801,429, after the feedblock two symmetric skin layers were coextruded using extruder C metering about 30 pounds per hour of the same type of PEN delivered by extruder A. This extrudate passed through two multipliers producing an extrudate of about 601 layers. U.S. Pat. No. 3,565,985 describes similar coextrusion multipliers. The extrudate passed through another film that coextruded skin layers at a total rate of 50 pounds per hour of PEN from extruder A. The web was length oriented to a draw ratio of about 3.2 with the web temperature at about 280° F. The film was subsequently preheated to about 310° F. in about 38 seconds and drawn in the transverse direction to a draw ratio of about 4.5 at a rate of about 11% per second. The film was then heat-set at 440° F. with no relaxation allowed. The finished film thickness was about 3 mil.

Figure 4:
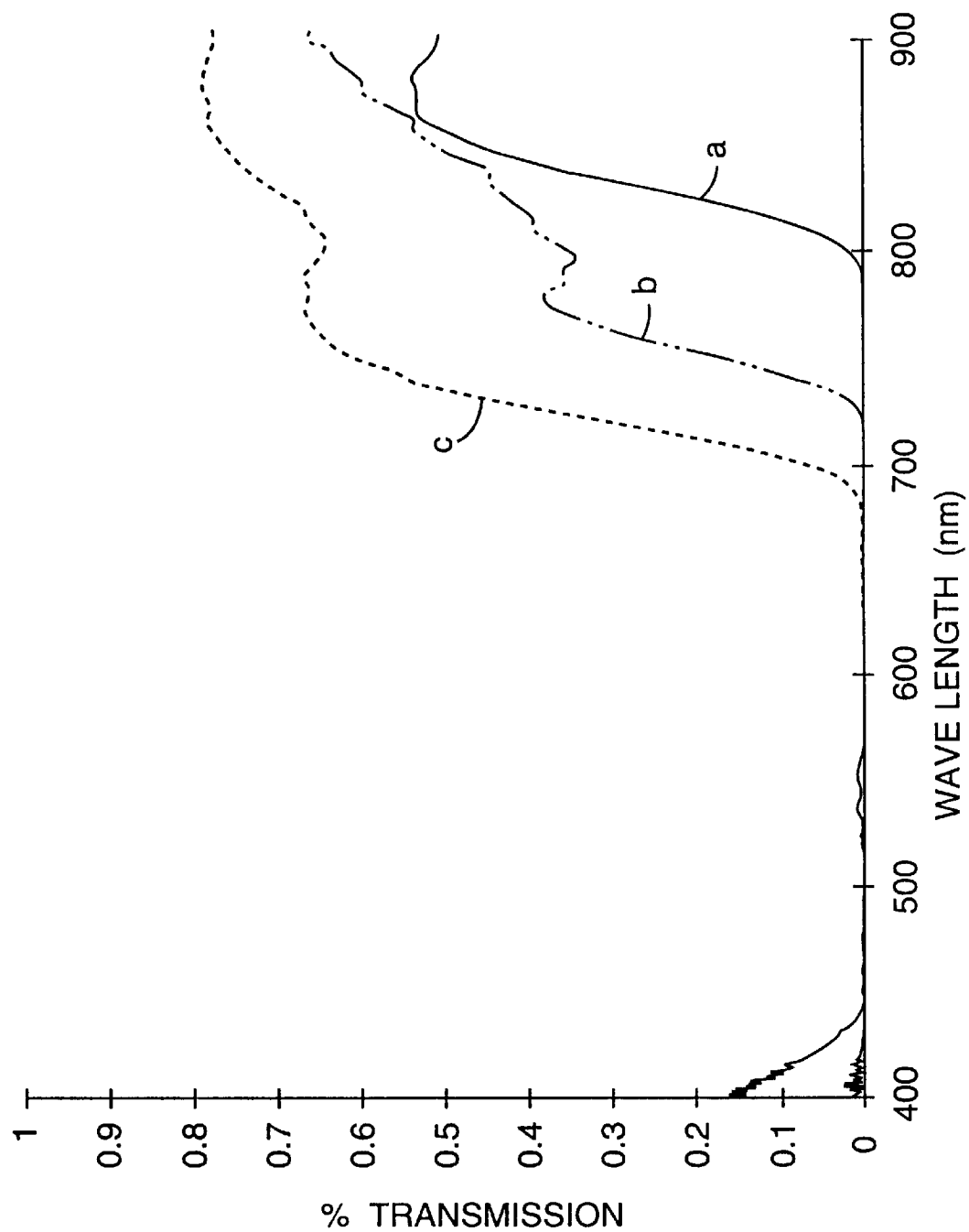

As seen in FIG. 4, curve (a), the bandwidth at normal incidence is about 350 nm with an average in-band extinction of greater than 99%. At an incidence angle of 50° from the normal both s (curve (b)) and p-polarized (curve (c)) light showed similar extinctions, and the bands were shifted to shorter wavelengths as expected. The red band-edge for s-polarized light is not shifted to the blue as much as for p-polarized light due to the expected larger bandwidth for s-polarized light.

EXAMPLE 3 (PEN:PCTG, 449, Polarizer)

A coextruded film containing 481 layers was made by extruding the cast web in one operation and later orienting the film in a laboratory film-stretching apparatus. The feedblock method was used with a 61 layer feedblock and three (2x) multipliers. Thick skin layers were added between the final multiplier and the die. Polyethylene naphthalate (PEN) with an intrinsic viscosity of 0.47 dl/g (60 wt. % phenol/40 wt. % dichlorobenzene) was delivered to the feedblock by one extruder at a rate of 25.0 pounds per hour. Glycol modified polyethylene cyclohexane terephthalate (PCTG 5445 from Eastman) was delivered by another extruder at a rate of 25.0 pounds per hour. PEN was on the skin layers. Another stream of PEN from the above extruder was added as skin layers at a rate of 25.0 pounds per hour. The cast web was 0.007 inches thick and 12 inches wide. The web was layer uniaxially oriented using a laboratory stretching film that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100° C. and heated to 135° C. for 45 seconds. Stretching was then commenced at 20%/second (based on original dimensions) until the sample was stretched to about 6:1 (based on gripper to gripper measurements). Immediately after stretching, the sample was cooled by blowing room temperature air at it. In the center, the sample was found to relax by a factor of 2.0.

Figure 5:
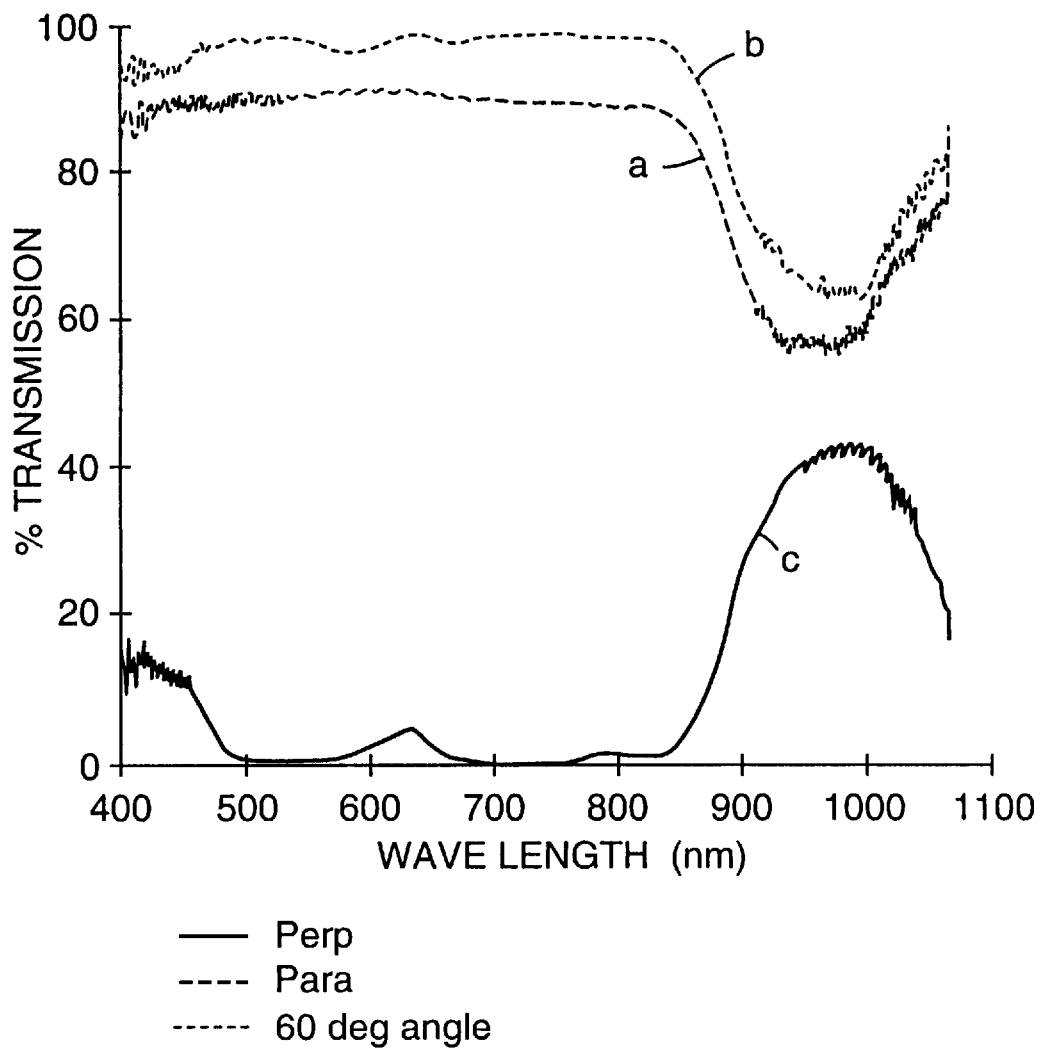

FIG. 5 shows the transmission of this multilayer film where curve a shows transmission of light polarized in the non-stretch direction at normal incidence, curve b shows transmission of p-polarized light polarized in the non-stretched direction at 60° incidence, and curve c shows the transmission of light polarized in the stretch direction at normal incidence.

EXAMPLE 4 (PEN:CoPEN, 601, Polarizer)

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 15% dimethyl isophthalate and 15% dimethyl terephthalate with ethylene glycol. The feedblock method was used to generate 151 layers. The feedblock was designed to produce a gradient distribution of layers with a ration of thickness of the optical layers of 1.22 for the PEN and 1.22 for the coPEN. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 6:
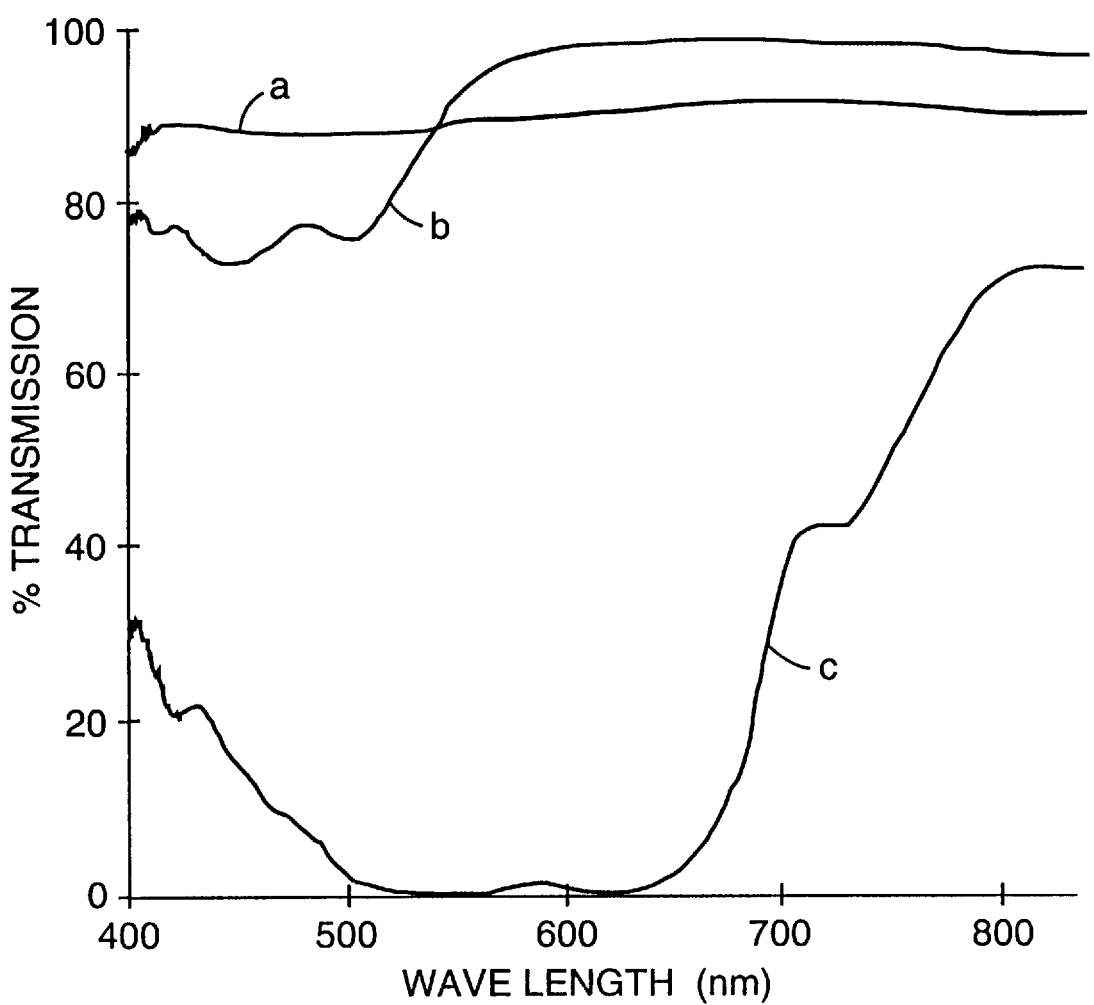

FIG. 6 shows the transmission for this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence (80–100%). Also note the very high extinction of light polarized in the stretched direction in the visible range (400–700 nm) shown by curve c. Extinction is nearly 100% between 500 and 650 nm.

EXAMPLE 5 (PEN:sPS, 481, Polarizer)

A 481 layer multilayer film was made from a polyethylene naphthalate (PEN) with an intrinsic viscosity of 0.56 dl/g measured in 60 wt. % phenol and 40 wt % dichlorobenzene purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2x) multipliers were used. Equal thickness skin layers containing the same PEN fed to the feedblock were added after the final multiplier at a total rate of 22 pounds per hour. The web was extruded through a 12" wide die to a thickness or about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 7A:
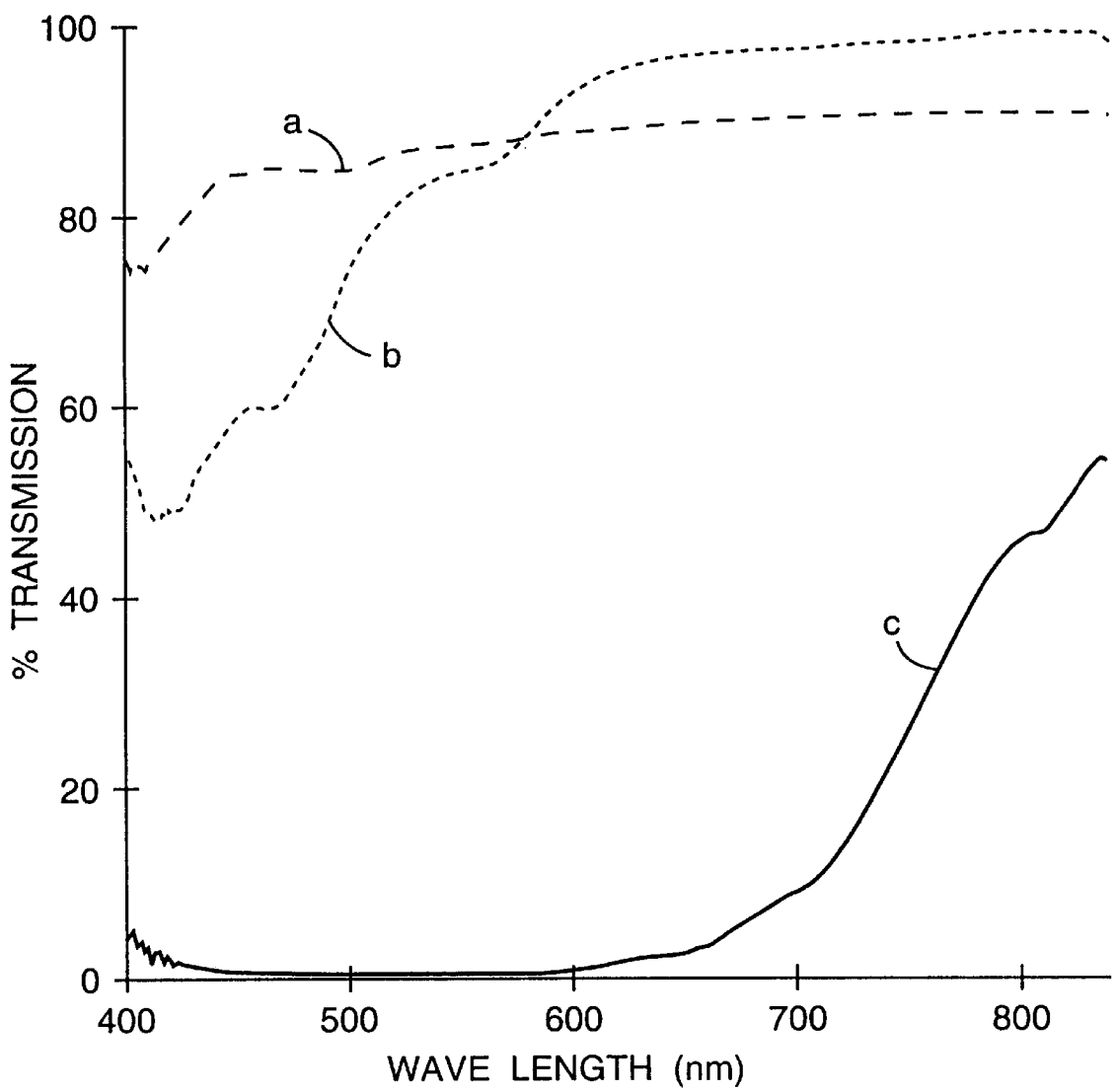

FIG. 7A shows the optical performance of this PEN:sPS reflective polarizer containing 481 layers. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. Average transmission for curve a over 400–700 nm is 86.2%, the average transmission for curve b over 400–700 nm is 79.7%. Also note the very high extinction of light polarized in the stretched direction in the visible range (400–700 nm) shown by curve c. The film has an average transmission of 1.6% for curve c between 400 and 700 nm. The % RMS color for curve a is 3.2%, while the % RMS color for curve b is 18.2%.

EXAMPLE 6 (PEN:coPEN, 603, Polarizer)

A reflecting polarizer comprising 603 layers was made on a sequential flat-film making line via a coextrusion process. A polyethylene naphthalate (PEN) with an intrinsic viscosity of 0.47 dl/g (in 60 wt % phenol plus 40 wt % dichlorobenzene) was delivered by an extruder at a rate of 83 pounds (38 kg) per hour and the coPEN was delivered by another extruder at 75 pounds (34 kg) per hour. The coPEN was a copolymer of 70 mole %, 2,6 naphthalene dicarboxylate methyl ester, 15 mole % dimethyl terephthalate, and 15 mole % dimethyl isophthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. This optical stack was multiplied by two sequential multipliers. The nominal multiplication ratio of the multipliers was 1,2 and 1.4, respectively. Between the final multiplier and the die, skin layers were added composed of the same coPEN described above, delivered by a third extruder at a total rate of 106 pounds (48 kg) per hour. The film was subsequently preheated to 300° F. (150° C.) in about 30 seconds and drawn in the transverse direction to a draw ratio of approximately 6 at an initial rate of about 20% per second. The finished film thickness was approximately 0.0035 inch (0.089 mm).

Figure 7B:
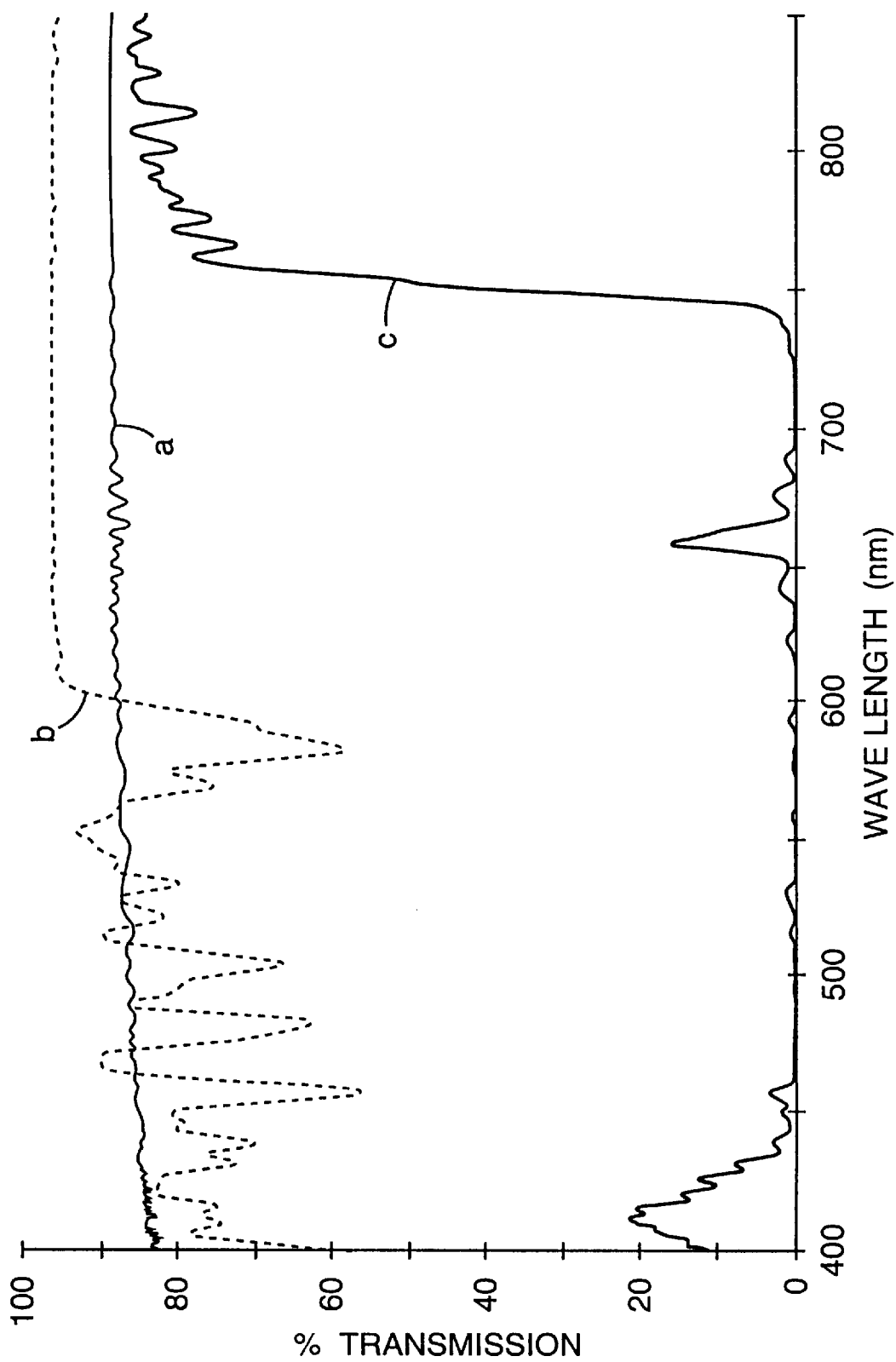

FIG. 7B shows the optical performance of the polarizer of Example 6. Curve a shows transmission of light polarized in the non-stretch direction at normal incidence, curve b shows transmission of p-polarized light in the nonstretch direction at a 50° angle of incidence (from normal), and curve c shows transmission of light polarized in the stretch direction at normal incidence. Note the very high transmission of light polarized in the non-stretch direction. Average transmission for curve a over 400–700 nm is 87%. Also note the very high reflectance of light polarized in the stretched direction in the visible range (400–700 nm) shown by curve c. The film has an average transmission of 2.5% for curve c between 400 and 700 nm. The % RMS color for curve b is 5%.

II. Electroluminescent Lamps Using Multilayer Optical Films

Electroluminescent lamps according to the present invention incorporate one or more multilayer optical films according to the present invention to polarize and/or reflect light.

Figure 8:
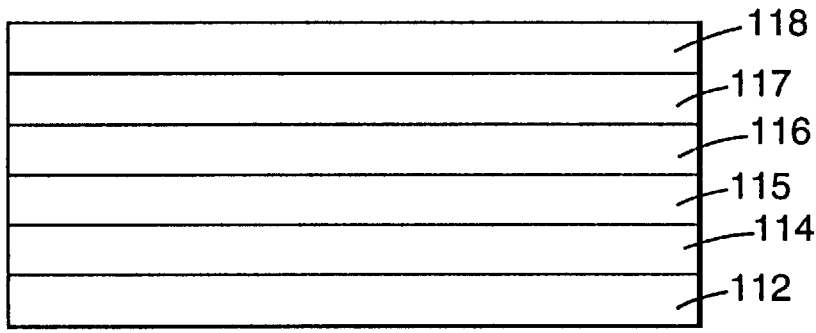
FIG. 8 is a schematic cross-sectional diagram of one illustrative electroluminescent lamp including multilayer optical film according to the present invention.

Referring now to FIG. 8 which schematically depicts an illustrative embodiment of an electroluminescent lamp 110 according to the present invention in cross-section, the multilayer optical film 112 is used as the "front" surface of the lamp, i.e., the surface from which light exits the lamp 110.

As with any electroluminescent lamp, the lamp 110 includes a layer 116 of electroluminescent phosphor material that, in the presence of an alternating electric field, becomes excited and emits photons with most of the radiated energy falling within the visible light spectrum. The electroluminescent material 116 may comprise a metal activated zinc sulfide or any other material which exhibits the electroluminescent behavior in the presence of electric fields.

To provide the necessary electric field across the electroluminescent material 116, two conductive layers 114 and 118 are located on either side of the electroluminescent material 116. A layer 115 of dielectric material is located between the first conductive layer 114 and the electroluminescent material 116 to insulate the electroluminescent material from the conductor 114. Likewise, another layer of dielectric material 117 is located on the opposite side of the electroluminescent material 116 to insulate it from the second conductive layer 118.

Both the conductive layer 114 and the dielectric layer 115 preferably transmit a large percentage of incident light to maximize the performance of the electroluminescent lamp 110. One material useful for the conductive layer 114 is indium tin oxide (ITO), although any light transmissive conductive material could be used for conductor 114. In the illustrative embodiment of electroluminescent lamp 110, the ITO layer is coated onto the multilayer optical film 112 using known methods for depositing thin layers on polymer films.

The dielectric layer could be any material with a dielectric constant high enough to act as an insulator between the conductive layer 114 and the electroluminescent material. In one illustrative embodiment of electroluminescent lamp 110, both layers 115 and 117 comprise VHB adhesive (#F9460PC), manufactured by Minnesota Mining and Manufacturing Company, St. Paul, Minn. The adhesive layer 115 was laminated to the conductive layer 114 on the multilayer optical film 112 and the adhesive layer 117 was laminated to an aluminum foil backing which serves as the second conductor 118. It will, however, be understood that many other methods of providing the adhesive layers 115 and 117 could be used.

After the adhesive layer 117 was in place on the conductive layer 118, the exposed adhesive layer 117 was coated with an excess amount of electroluminescent material 116, some of which adhered to the adhesive layer 117. The exact phosphor material used in the illustrative example depicted in FIG. 8 was a copper-doped zinc sulfide phosphor sold under the designation "723" by General Electric Sylvania. Those skilled in the art of electroluminescent lamps will, however, understand that many other electroluminescent materials could be used in place of the specific material recited above.

The aluminum conductive layer 118 performs two functions in electroluminescent lamp 110. First, it serves as the second conductor necessary to provide an electric field across the electroluminescent material 116. Second, it serves as the back reflector for electroluminescent lamp 110 by reflecting light incident upon it, to ideally redirect the light through the multilayer optical film layer 112 and to a viewer.

Furthermore, the adhesive layers 115 and 117 also perform two functions in the electroluminescent lamp 110. First, as indicated above, they insulate the electroluminescent material 116 from both conductive layers 114 and 118 to provide for proper operation of the electroluminescent lamp 110. Second, they serve to structurally bond the various layers together to form a relatively inexpensive electroluminescent lamp 110 which does not require a binder or other material to hold the electroluminescent material and function as a dielectric.

In the illustrative embodiment of electroluminescent lamp 110, the multilayer optical film layer 112 operates as a reflective polarizer, transmitting a majority of light emitted from the electroluminescent material 116 of one polarization orientation while reflecting a majority of the light having a second polarization orientation. As a result, light emitted from the electroluminescent lamp 110 is substantially of one polarization orientation.

An important benefit of using the multilayer optical film according to the present invention for layer 112 is its ability to reflect light incident at angles off of normal. This characteristic is typically not found in known reflective polymeric films.

Another advantage of using multilayer optical film for layer 112 is that it does not absorb a significant amount of light that is of the wrong polarization orientation, as do absorptive polarizers. Rather, the light of the wrong polarization is reflected from the multilayer optical film layer 112 back into the electroluminescent lamp 110. After reflection back into lamp 110, the polarization of the light may be randomized by the electroluminescent particles or other materials within the lamp so that if it is reflected back towards the multilayer optical film layer 112, it may have the proper polarization to allow for its transmission through the multilayer optical film layer 112.

Figure 9:
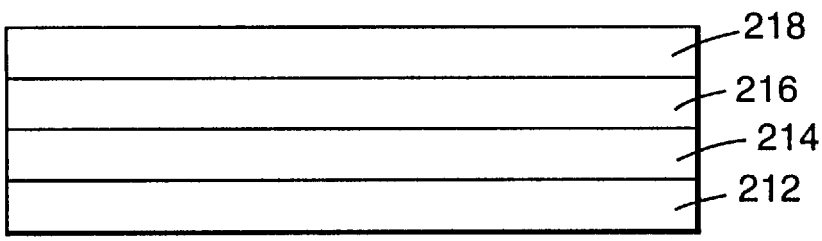
FIG. 9 is a schematic cross-sectional diagram of another illustrative electroluminescent lamp including multilayer optical film according to the present invention.

One alternate construction of another illustrative electroluminescent lamp 210 is depicted in FIG. 9 which schematically depicts another illustrative embodiment of electroluminescent lamp 210 according to the present invention in cross-section. Similar to electroluminescent lamp 110, multilayer optical film 212, which operates as a reflective polarizer, is used as the "front" surface of the lamp, i.e., the surface from which light exits the lamp 210.

In electroluminescent lamp 210, the layer 216 of electroluminescent material comprises a phosphor material dispersed in an epoxy binder. The epoxy serves two purposes—first, it insulates the phosphor material from the front and back conductive layers 114 and 118, respectively. Second, it bonds the assembly together when manufactured according to the following process, although it will be understood that many other methods of bonding the layers together could alternatively be used.

In one process which could be used to arrive at the construction of electroluminescent lamp 210 depicted in FIG. 9, the electroluminescent phosphor is mixed in a slurry of "723" phosphor material (described above) along with an epoxy, e.g., Devcon 5 Minute Epoxy (#14250). The phosphor material and epoxy were mixed at a ratio of 1:1, by weight.

The slurry of electroluminescent phosphor/epoxy was coated onto an aluminum foil which would serve as the conductive layer 218. Before curing the epoxy, the slurry-coated aluminum foil was laminated to a second composite including a conductive layer 214 located on multilayer optical film 212, after which the epoxy was cured, resulting in the construction shown in FIG. 9.

Because the electroluminescent lamp 210 uses multilayer optical film according to the present invention for layer 212, it can take advantage of the many benefits of the multilayer optical film that are discussed above with respect to lamp 110.

Likewise, any electroluminescent lamp construction can take advantage of the beneficial properties of the multilayer optical film according to the present invention by using the multilayer optical film in a layer which functions as a reflective polarizer. This would apply whether the electroluminescent lamp was constructed using epoxies or other resins to bind the electroluminescent materials, adhesives with electroluminescent powders bonded to their surfaces, or if thin-film electroluminescent lamps were constructed on a substrate comprising the multilayer optical film according to the present invention. These various techniques for manufacturing electroluminescent lamps will be well known to those skilled in the art.

Figure 10:
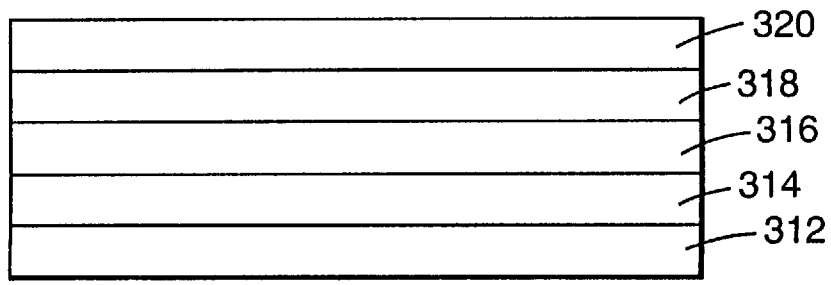
FIG. 10 is a schematic cross-sectional diagram of another illustrative electroluminescent lamp including multilayer optical film according to the present invention.

Another illustrative embodiment of an electroluminescent lamp 310 is depicted schematically in cross-section in FIG. 10. In this embodiment, the electroluminescent lamp 310 employs the multilayer optical film according to the present invention in two locations. The front layer 312 preferably comprises a multilayer optical film reflective polarizer (as described above with respect to electroluminescent lamps 110 and 210) and a totally reflective multilayer optical film according to the present invention is also used as a back reflector 320 to reflect light towards the front surface of the electroluminescent lamp 310.

The electroluminescent lamp 310 includes a layer 316 of electroluminescent phosphor material which can be bonded to a dielectric adhesive, bound with an epoxy resin or other dielectric binder, or deposited in a thin-film construction. No separate dielectric layers on each side of layer 316 are shown, although it will be understood that in some constructions separate dielectric layers may be required to insulate the electroluminescent material from the conductors.

To provide the necessary electric field across the electroluminescent material 316, two conductive layers 314 and 318 are located on either side of the electroluminescent material 316. The back conductive layer 318 is preferably an electrically conductive material that does not absorb a significant amount of light to allow the back reflective layer 320 to reflect as much light as possible out of electroluminescent lamp 310. One suitable material for conductive layer 318 would be the ITO material typically used for the front conductive layer 314 in many electroluminescent lamps.

In addition to conductive layer 318, it is preferred that all of the materials located between the reflective polarizing multilayer optical film 312 and the purely reflective multilayer optical film 320 absorb a minimal amount of incident light to enhance the efficiency of the electroluminescent lamp 310.

As with the electroluminescent lamps 110 and 210 described above, the multilayer optical film layer 312 operates as a reflective polarizer, transmitting a majority of light emitted from the electroluminescent material 316 of one polarization orientation while reflecting a majority of the light having a second polarization orientation. As a result, light emitted from the electroluminescent lamp 310 is substantially of one polarization orientation.

Figure 11:
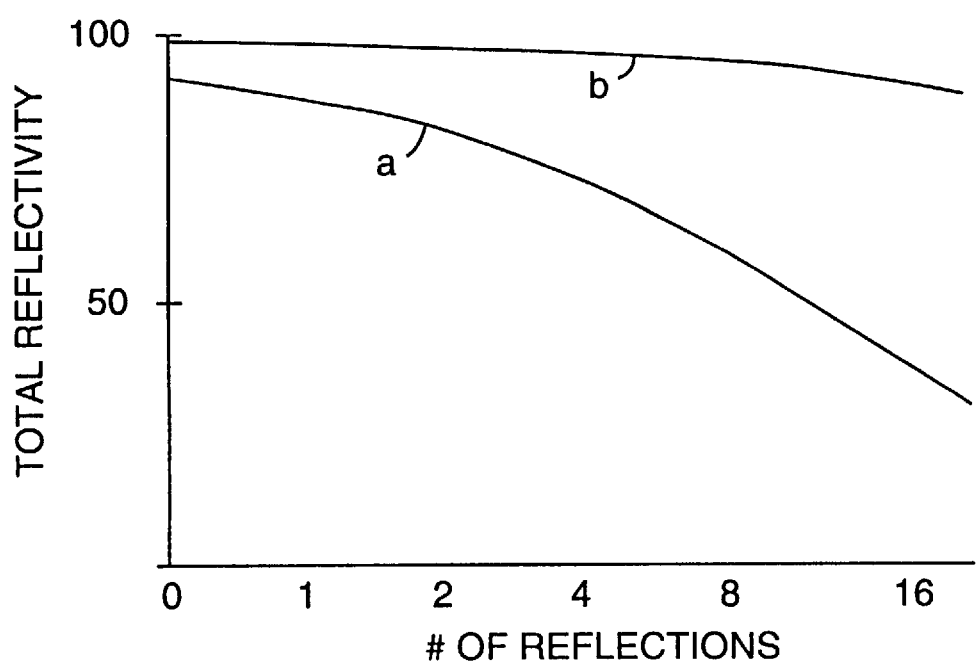
FIG. 11 is a graphical representation illustrating the relationship between the number of reflections experienced by a ray of light (x-axis) as compared to the relative intensity of the light ray (y-axis) for reflective surfaces made of multilayer optical film and a standard reflector.

In addition to the advantages of using the multilayer optical film according to the present invention as a reflective polarizing layer 312, an important additional advantage of using multilayer optical film according to the present invention for both the front layer 312 and the back reflector 320 is graphically illustrated in FIG. 11. Known reflective surfaces, such as aluminum, have a reflectance of, at best, about 96% of incident light. Using the multilayer optical film according to the present invention for the front layer 312 will result in recycling of light having the wrong polarization.

Using a conventional back reflector with a multilayer optical film reflective polarizer could result in unacceptable absorptive losses due to the increased number of reflections a single light ray might experience before exiting an electroluminescent lamp. As shown in FIG. 11, the intensity of light which has been reflected significantly decreases after a relatively low number of reflections when the surface reflecting the light absorbs only about 6% of the light.

In contrast, light reflected from multilayer optical film according to the present invention (having a reflectivity of about 99.4%) shows a much smaller decrease in intensity for the same number of reflections. By using a reflective multilayer optical film for the back reflector in electroluminescent lamp 320 in combination with a reflective polarizing multilayer optical film layer 312, the amount of absorptive losses can be significantly reduced, thereby improving the efficiency of electroluminescent lamp 320.

Because the majority of light incident upon the multilayer optical film reflectors such as 320 that is lost escapes through transmission, it may be advantageous to provide the back surfaces of the multilayer optical film reflector 320, i.e., the surface facing away from the electroluminescent material 316, with a thin metal or other reflective coating to reflect light that would otherwise be lost to transmission, thereby improving the reflectivity of the multilayer optical film. It will of course, be understood that the metallic or other reflective coating may suffer from some absorption losses, but the fraction of light transmitted through the film will typically be less than 5% (more preferably less than 1%) of the total light incident on the film. The metallic or other reflective coating may also be useful to reduce visible iridescence if leakage of narrow bands of wavelengths occurs in the multilayer optical film.

It should be understood that the front layer 312 in electroluminescent lamp 320 could be provided of a material other than multilayer optical film, particularly if polarized light is not required. In any electroluminescent lamp constructed using a multilayer optical film as a back reflector 320, efficiency gains can be expected due to the low absorptivity/high reflectance of the film.

It should also be understood that many other films and materials could be combined to further increase the performance of electroluminescent lamps according to the present invention. One example is the use of a structured partially reflective film alone (where polarized light is not required) or in combination with a reflective polarizing multilayer optical film front layer. One micro-replicated structured partially reflective film is marketed under the tradename SCOTCH OPTICAL LIGHTING FILM by Minnesota Mining and Manufacturing Company, St. Paul, Minn.

Structured partially reflective films typically have excellent reflectivity over certain ranges of angles but high transmission over others. Micro-replicated structured partially reflective films are described in LUMINANCE CONTROL FILM, Serial No. 08/312,720, filed on Sep. 27, 1994, which is hereby incorporated by reference. Other structured films which function as partial reflectors are typically referred to "transflectors."

In general, structured partially reflective films transmit light approaching in a relatively narrow range of angles while reflecting the remainder of the light approaching from outside the narrow range of angles. In addition, the transmitted light is then refracted through the film and emerges from the opposite side within a known range of angles. As a result, structured films transmit light and enhance brightness in optical devices by recycling light which would otherwise exit an optical device outside of known range of angles which would likely not be directed at a viewer. Although recycling light in that manner is generally desired, it can be a disadvantage when combined with conventional reflectors because a portion of the light which is reflected back into the electroluminescent lamp is absorbed by those conventional reflectors.

Electroluminescent lamps according to the present invention, however, do not suffer from that disadvantage when the back reflectors are comprised of a multilayer optical film which does not absorb a significant amount of light incident upon them.

Figure 12:
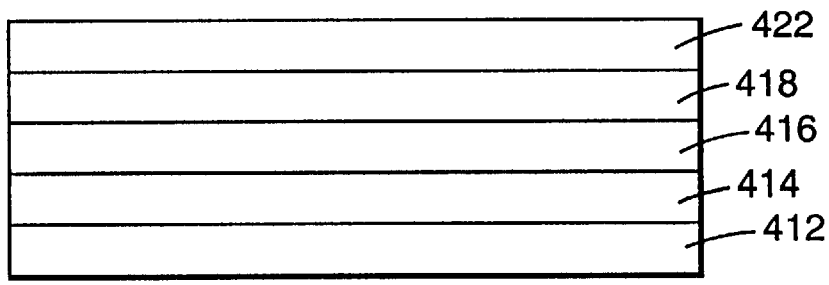
FIG. 12 is a schematic cross-sectional diagram of another illustrative electroluminescent lamp including multilayer optical film according to the present invention.

Among others, another variation of an electroluminescent lamp according to the present invention for providing polarized light could comprise a two-sided electroluminescent lamp in which light is emitted in two generally opposite directions from a single layer of electroluminescent material. A simplified schematic cross-sectional view of such a lamp is provided in FIG. 12, which includes a single layer 416 of electroluminescent material, surrounded on both sides by conductive layers 414 and 418. No separate dielectric layers on each side of layer 416 are shown, although it will be understood that in some constructions separate dielectric layers may be required to insulate the electroluminescent material from the conductors.

Outer layers 412 and 422 preferably comprise reflective polarizing multilayer optical film according to the present invention. As a result, light emitted from the electroluminescent material 416 can exit out of the lamp 410 through either layer 412 or layer 422, providing it had the proper polarization orientation.

Variations in the construction of a two-sided electroluminescent lamp 410 could include aligning the multilayer optical film layers 412 and 422 such that the polarization planes are crossed at 90° angles to prevent light from traveling completely through the lamp, thus providing a lamp which is opaque. An additional advantage of that construction is that a large percentage of the light emitted from the electroluminescent layer 416 may experience no reflection before exiting the lamp 410, thereby enhancing efficiency of the lamp.

Alternatively, the polarization planes of the two multilayer optical film layers could be aligned or crossed at any desired angle to achieve a desired degree of opacity in the lamp 410.

Figure 13:
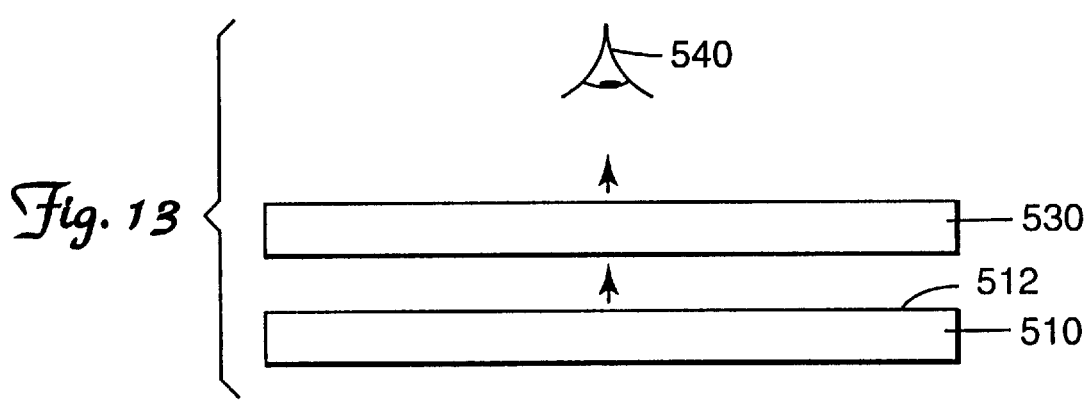
FIG. 13 is a schematic diagram of an illustrative electroluminescent lamp in combination with an LCD panel.

An electroluminescent lamp according to the present invention that employ a layer of reflective polarizing multilayer optical film is particularly useful in conjunction with a liquid crystal display (LCD) which relies on polarized light to display information to a viewer. One illustrative example of such a combination is depicted schematically in FIG. 13, which includes an electroluminescent lamp 510 according to the present invention (using a layer of reflectively polarizing multilayer optical film to allow only polarized light to escape from the lamp). An LCD 530 is located proximate the light emitting side 512 of the lamp 510 and a viewer 540 is located on the opposite side of the LCD 530 where the information displayed on the LCD 530 can be viewed. Although this particular application of one illustrative electroluminescent lamp according to the present invention is described herein, it will be understood that electroluminescent lamps according to the present invention could be used in any other application where an electroluminescent lamp would be useful.

Although the present invention has been described above with respect to illustrative examples, modifications may be made from those examples without departing from the scope of the invention as defined by the appended claims.

What is claimed is:

1. An electroluminescent lamp comprising:
   a) a light transmissive layer comprising a multilayer optical film, wherein the multilayer optical film reflects at least about 80% of normally incident visible light having a first polarization orientation and at least about 80% of visible light of the first polarization which is incident on the multilayer optical film at an angle of 60 degrees from normal, and further wherein the multilayer optical film transmits at least about 50% of normally incident visible light having a second polarization orientation, wherein the second polarization orientation is substantially orthogonal to the first polarization orientation;

b) a visible light-transmissive first conductive layer having first and second surfaces, the first surface of the first conductive layer proximate a first surface of the multilayer optical film;

c) a visible light-emitting layer comprising electroluminescent material, the light-emitting layer having first and second surfaces, the first surface of the light-emitting layer proximate the second surface of the first conductive layer; and d) a second conductive layer having first and second surfaces, the first surface of the second conductive layer proximate the second surface of the light-emitting layer.

2. A lamp according to claim 1, wherein the multilayer optical film reflects at least about 90% of normally incident visible light having the first polarization orientation.

3. A lamp according to claim 1, wherein the multilayer optical film reflects at least about 95% of normally incident visible light having the first polarization orientation.

4. A lamp according to claim 1, wherein the multilayer optical film reflects at least about 98% of normally incident visible light having the first polarization orientation.

5. A lamp according to claim 1, wherein the multilayer optical film reflects at least about 99% of normally incident visible light having the first polarization orientation.

6. An electroluminescent lamp according to claim 1, further comprising a back reflector having first and second surfaces, the first surface of the back reflector proximate the second surface of the second conductive layer, wherein the back reflector comprises a multilayer optical film that reflects at least about 80% of all normally incident visible light and at least about 80% of visible light incident on the back reflector at an angle of 60 degrees from normal.

7. An electroluminescent lamp according to claim 6, wherein the back reflector reflects at least about 90% of all normally incident visible light.

8. An electroluminescent lamp according to claim 6, wherein the back reflector reflects at least about 95% of all normally incident visible light.

9. An electroluminescent lamp according to claim 6, wherein the back reflector reflects at least about 98% of all normally incident visible light.

10. An electroluminescent lamp according to claim 6, wherein the back reflector reflects at least about 99% of all normally incident visible light.

11. An electroluminescent lamp according to claim 6, wherein the back reflector reflects at least about 90% of all visible light incident at an angle of 60 degrees from normal.

12. An electroluminescent lamp according to claim 6, wherein the back reflector reflects at least about 95% of all visible light incident at an angle of 60 degrees from normal.

13. An electroluminescent lamp according to claim 6, wherein the back reflector reflects at least about 98% of all visible light incident at an angle of 60 degrees from normal.

14. An electroluminescent lamp according to claim 6, wherein the back reflector reflects at least about 99% of all visible light incident at an angle of 60 degrees from normal.

15. An electroluminescent lamp comprising:

a) a visible light transmissive layer comprising a multilayer optical film, wherein the multilayer optical film reflects at least about 90% of normal visible light having a first polarization orientation and at least about 80% of visible light of the first polarization which is incident on the multilayer optical film at an angle of 60 degrees from normal, and further wherein the multilayer optical film transmits at least about 50% of normally incident visible light having a second polarization orientation, wherein the second polarization orientation is substantially orthogonal to the first polarization orientation;

b) a visible light-transmissive first conductive layer having first and second surfaces, the first surface of the first conductive layer proximate a first surface of the multilayer optical film;

c) a visible light-emitting layer comprising electroluminescent material, the light-emitting layer having first and second surfaces, the first surface of the visible light-emitting layer proximate the second surface of the first conductive layer;

d) a second conductive layer having first and second surfaces, the first surface of the second conductive layer proximate the second surface of the light-emitting layer; and e) a back reflector having first and second surfaces, the first surface of the back reflector proximate the second surface of the second conductive layer, wherein the back reflector comprises a multilayer optical film that reflects at least about 90% of all normally incident visible light and at least about 80% of all visible light incident on the back reflector at an angle of 60 degrees from normal.

16. An electroluminescent lamp comprising:

a) a visible light transmissive layer comprising a multilayer optical film, the multilayer optical film comprising:

1) a first layer comprising an oriented birefringent, the first layer having an average thickness of not more than about 0.5 microns; and 2) a second layer of a selected polymer, each second layer having an average thickness of not more than 0.5 microns;

b) a visible light-transmissive first conductive layer having first and second surfaces, the first surface of the first conductive layer proximate a first surface of the multilayer optical film;

c) a visible light-emitting layer comprising electroluminescent material, the light-emitting layer having first and second surfaces, the first surface of the light-emitting layer proximate the second surface of the first conductive layer; and d) a second conductive layer having first and second surfaces, the first surface of the second conductive layer proximate the second surface of the light-emitting layer.

17. An electroluminescent lamp according to claim 16, wherein the first layer of the multilayer optical film comprises a crystalline naphthalene dicarboxylic acid polyester.

18. An electroluminescent lamp according to claim 16, wherein the oriented birefringent first layer is more birefringent than the second polymer.

19. An electroluminescent lamp according to claim 16, wherein the multilayer optical film further comprises a plurality of first and second layers, wherein one of the second layers is located between each adjacent pair of first layers.

20. An electroluminescent lamp according to claim 16, wherein the multilayer optical film comprises at least fifty of each of the first and second layers.

21. An electroluminescent lamp according to claim 16, further comprising a back reflector having first and second surfaces, the first surface of the back reflector proximate the second surface of the second conductive layer, wherein the back reflector comprises a reflective multilayer optical film comprising:

1) a first layer comprising a biaxially oriented birefringent, the first layer having an average thickness of not more than about 0.5 microns; and 2) a second layer of a selected polymer, each second layer having an average thickness of not more than 0.5 microns.

22. An electroluminescent lamp according to claim 21, wherein the biaxially oriented birefringent first layer is more birefringent than the selected polymer of the second layer of the reflective multilayer optical film.

* * * * *